United States Patent [19]
Watanabe

[11] Patent Number: 5,537,910
[45] Date of Patent: Jul. 23, 1996

[54] ACTUATOR FOR A BRAKE BOOSTER

[75] Inventor: Makoto Watanabe, Saitama-ken, Japan

[73] Assignee: Jidosha Kiki Co., Ltd., Tokyo, Japan

[21] Appl. No.: 537,295

[22] Filed: Sep. 27, 1995

[30] Foreign Application Priority Data

Oct. 28, 1994 [JP] Japan .................................. 6-289183

[51] Int. Cl.$^6$ ...................................................... F15B 9/10
[52] U.S. Cl. ...................................................... 91/376 R
[58] Field of Search ............................. 91/369.1, 376 R, 91/374; 92/98 R

[56] References Cited

U.S. PATENT DOCUMENTS

| | | | |
|---|---|---|---|
| 3,452,644 | 7/1969 | Julow | 91/376 R X |
| 4,535,591 | 8/1985 | Kobayashi | 91/376 R X |
| 4,864,915 | 9/1989 | Johnston et al. | 91/376 R |
| 5,005,465 | 4/1991 | Boehm et al. | 91/376 R X |
| 5,079,991 | 1/1992 | Cadeddu | 91/376 R |
| 5,228,377 | 7/1993 | Watanabe . | |

FOREIGN PATENT DOCUMENTS

| | | | |
|---|---|---|---|
| 2698333 | 5/1994 | France | 91/376 R |
| 60-25840 | 2/1985 | Japan . | |

*Primary Examiner*—Hoang Nguyen
*Attorney, Agent, or Firm*—Flynn, Thiel, Boutell & Tanis

[57] ABSTRACT

An actuator which causes an input shaft to move forward is disposed within the inner periphery of a valve body at its rear end. When a brake booster is inoperative, an atmospheric pressure is introduced into a pressure chamber of the actuator, but when a flow path switching valve is operated to introduce a negative pressure into the pressure chamber as required, a pressure differential is developed across a piston of the actuator, thus driving the piston forward. This allows the input shaft to be driven forward, whereby the brake booster can be operated without depressing a brake pedal. Since the atmosphere is introduced into the pressure chamber of the actuator when the brake booster is inoperative, a fracture or disengagement of a conduit which is connected to the pressure chamber cannot develop a pressure differential across the piston of the actuator, thus preventing the actuator from operating. Accordingly, a malfunctioning of the brake booster as a result of a fracture of the conduit or the like can be reliably prevented.

4 Claims, 2 Drawing Sheets

ACTUATOR FOR A BRAKE BOOSTER

FIELD OF THE INVENTION

The invention relates to a booster which is used in a brake of an automobile, or a booster which has the function of an automatic brake.

DESCRIPTION OF THE PRIOR ART

A brake booster is known in the art including a shell having bellows disposed therein, into which a negative pressure or the atmosphere can be selectively introduced, as disclosed, for example, in Japanese Laid-Open Patent Application No. 25,840/1985 and U.S. Pat. No. 5,228,377. In a conventional arrangement as cited, a negative pressure is introduced into the bellows under the inoperative condition of the brake booster, and when required, the atmosphere is introduced, instead of the negative pressure, into the bellows. This introduces the atmosphere into a variable pressure chamber, whereby the brake booster can be actuated without depressing a brake pedal, thus providing the function of an automatic brake.

In a conventional arrangement as mentioned above, one end of a conduit is connected to the shell of the brake booster for communication with the interior of the bellows while the other end of the conduit communicates with a source of negative pressure, with a flow path switching valve being disposed in the conduit for allowing the interior of the bellows to selectively communicate with the atmosphere or the source of negative pressure. As mentioned, the negative pressure is introduced into the bellows under the inoperative condition, and when required, the atmosphere is introduced into the bellows by operating the switching valve to provide the functioning of an automatic brake.

However, such conventional arrangement suffers from a disadvantage that the brake booster remains acting as an automatic brake if a fracture occurs in the conduit between the switching valve and the bellows or if the connection of the one end of the conduit with the shell is broken since then the atmosphere is introduced into the bellows without operating the switching valve.

SUMMARY OF THE INVENTION

In view of the foregoing, the invention provides a booster including a tubular valve body slidably disposed within a shell and having its rear end projecting outward of the shell, a power piston disposed on the valve body, a constant and a variable pressure chamber defined across the power piston, a valve mechanism disposed within the valve body for switching a communication between the constant pressure chamber and the variable pressure chamber and the atmosphere, and an input shaft having its one end connected to a valve plunger, which forms part of the valve mechanism, and having its other end connected to a brake pedal. In accordance with the invention, there is provided an actuator disposed on the rear side of the valve body for causing the input shaft to move forward, the actuator comprises a first seal means disposed across the inner periphery of the valve body and the outer periphery of the input shaft for maintaining a hermetic-seal therebetween, a communication path for causing an atmosphere passage formed within the valve body at a location forward of the first seal means to communicate with the atmosphere, a piston connected to the outer periphery of the input shaft at a location rearward of the first seal means and having a rear end face which is normally subject to the atmosphere, second seal means extending across the piston and the inner periphery of the valve body for maintaining a hermetic seal therebetween, and a pressure chamber formed within the valve body at a location intermediate the first seal means and the piston, the atmosphere being introduced into the pressure chamber when the booster is inoperative and the negative pressure being introduced into the pressure chamber when required.

With this arrangement, the atmosphere is introduced into the pressure chamber of the actuator under the inoperative condition of the booster, whereby the atmospheric pressure is acting across the piston, which therefore remains stationary. When a negative pressure is introduced into the pressure chamber under such inoperative condition, a pressure differential is developed across the piston due to the negative pressure and the atmospheric pressure. Accordingly, the piston and its connected input shaft are driven forward in response to such pressure differential. This operates the valve mechanism to introduce the atmosphere into the variable pressure chamber through the communication path and the atmosphere passage, thus allowing the booster to function as an automatic brake without depressing the brake pedal.

If a fracture occurs in the conduit which provides a communication between the atmosphere and the pressure chamber of the actuator or the connection of the end of the conduit with the pressure chamber is broken or disengaged from the pressure chamber under the inoperative condition of the booster, the interior of the pressure chamber remains under the atmospheric pressure without experiencing any fluctuation in the pressure. Accordingly, no pressure differential is developed across the piston under such situation, preventing any forward movement of the piston or its connected input shaft.

In this manner, a malfunctioning of the booster can be positively prevented if a fracture occurs in the conduit which connects the pressure chamber with the atmosphere or if one end of the conduit connected to the pressure chamber becomes disengaged under the inoperative condition of the booster.

Above and other objects, features and advantages of the invention will become apparent from the following description of several embodiments thereof with reference to the attached drawings.

DETAILED DESCRIPTION OF EMBODIMENTS

Figure 1:
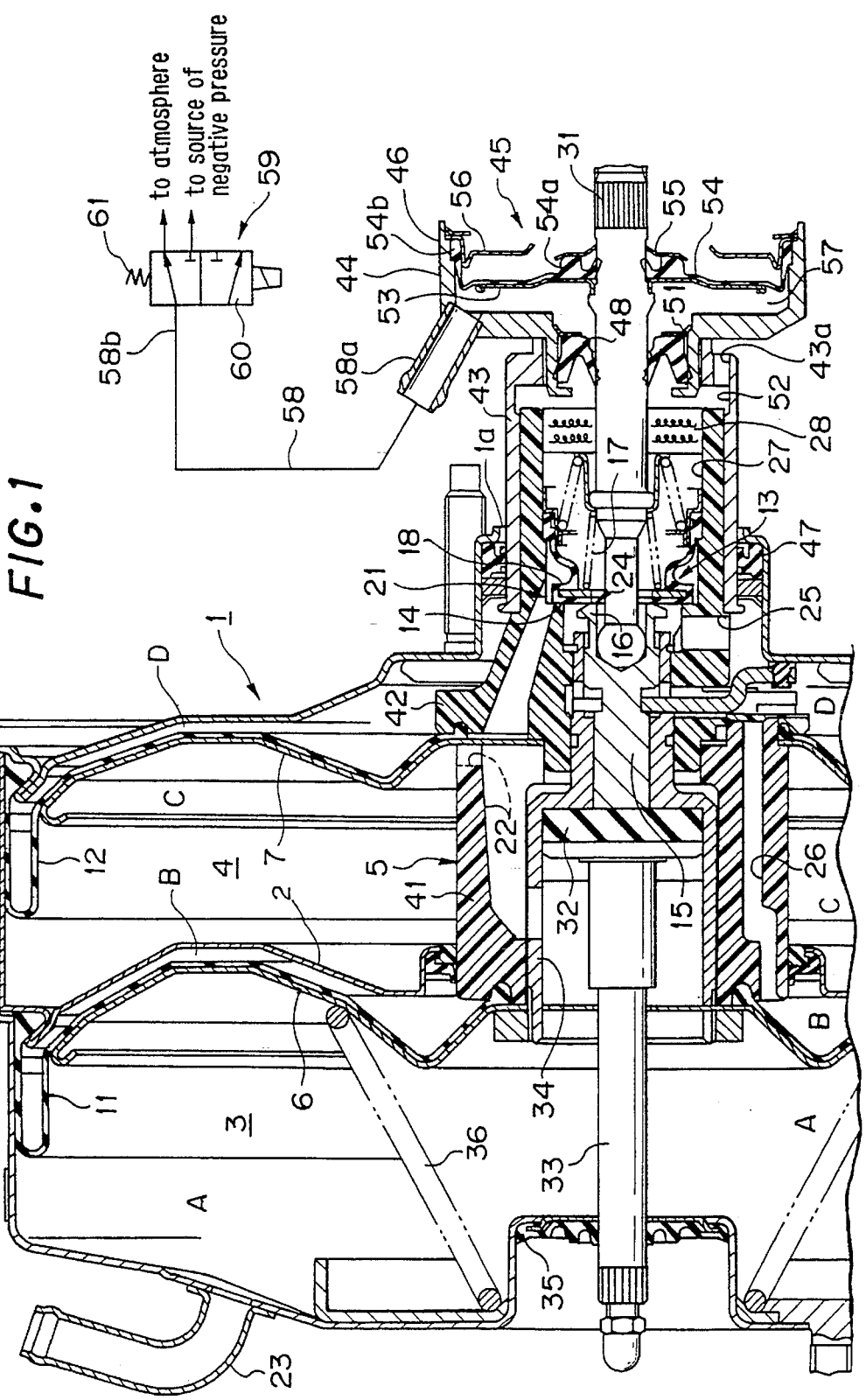
FIG. 1 is a longitudinal section, partly in elevation, of one embodiment of the invention.

Referring to the drawings, several embodiments of the invention will now be described. Referring to FIG. 1, a brake booster includes a shell 1 which acts as an enclosed vessel, and the interior of the shell 1 is divided, by a center plate 2 which is centrally disposed therein, into a pair of front chamber 3 and rear chamber 4.

A substantially tubular valve body 5 is disposed within the shell 1 and has its outer periphery, at its front portion, disposed slidably extending through an axial portion of the center plate 2 while maintaining a hermetic seal therebetween. At its rear portion, the outer periphery of the valve body 5 slidably extends through an opening 1a of the shell 1 to the outside thereof while maintaining a hermetic seal therebetween.

A front power piston 6 and a rear power piston 7, which are received in the front chamber 3 and the rear chamber 4, respectively, are connected to the valve body 5, and a front diaphragm 11 and a rear diaphragm 12 are applied to the back surfaces of the power pistons 6 and 7, respectively, thus defining a constant pressure chamber A and a variable pressure chamber B across the front diaphragm 11, and a constant pressure chamber C and a variable pressure chamber D across the rear diaphragm 12.

A valve mechanism 13 which switches a fluid circuit is disposed within the valve body 5. Specifically, the valve mechanism 13 comprises an annular, first valve seat 14 which is formed around the inner peripheral surface of the valve body 5, an annular, second valve seat 16 formed on the right end of a valve plunger 15, which is slidably disposed within the valve body 5, at a location radially inward of the annular first valve seat 14, and a valve element 18 which is urged from the right under the resilience of a spring 17 to be seated upon either valve seat 14 or 16.

A combination of the first valve seat 14 and an annular seat portion of the valve element 18 which is adapted to be engaged with or disengaged from the seat 14 defines a vacuum valve 21, and a space located radially outward of the vacuum valve 21 communicates through a constant pressure passage 22, formed in the valve body 5, with the constant pressure chamber A and the constant pressure chamber C, with the constant pressure chamber A communicating with an intake manifold of an engine through a tubing 23 which introduces a negative pressure.

An atmosphere valve 24 is formed by a combination of the second valve seat 16 and an annular seat portion of the valve element 18 which is adapted to be engaged with or disengaged from the seat 16. A space located radially outward of the atmosphere valve 24 and located radially inward of the vacuum valve 21 or a space located intermediate the vacuum valve 21 and the atmosphere valve 24 communicates through a variable pressure passage 25, formed within the valve body 5, with the variable pressure chamber D, which in turn communicates with the variable pressure chamber B through an axial variable pressure passage 26 which is formed in the valve body 5.

A space located radially inward of the atmosphere valve 24 communicates with the atmosphere, acting as a source of pressure fluid, through an atmosphere passage 27 which is defined around the inner periphery of the valve body 5, with a filter 28 being disposed in the atmosphere passage 27.

A front end of an input shaft 31 is pivotally connected to the right end of the valve plunger 15, and the rear end of the input shaft 31 is connected to a brake pedal, not shown. On the other hand, a reaction disc 32 is disposed forwardly of the valve plunger 15, and is held sandwiched between a rear end of an output shaft 33 and a stepped end face of a stepped sleeve 34 which forms part of the valve body 5.

The front end of the output shaft 33 slidably extends through a front axial portion of the shell 1 and through a seal member 35 to the outside thereof for connection with a piston of a master cylinder, not shown. The valve body 5 is normally maintained in its inoperative position shown by a return spring 36.

The arrangement and the operation of the booster described remains unchanged from a conventional booster known in the art.

In the present embodiment, the valve body 5 comprises four tubular members 41, 42, 43 and 44 which are axially sequentially disposed as viewed from the front toward the rear side, and the stepped sleeve 34 which is fitted inside the tubular members 41 and 42. An actuator 45 which causes the input shaft 31 to move forward is disposed within the tubular members 43, 44 which extend through the opening 1a of the shell 1 to the outside thereof. The manner of connecting the stepped sleeve 34 and the tubular members 41, 42 as well as the manner of disposing other component members such as the power pistons 6, 7 are known in the art, and will not be specifically described.

In the actuator 45 of the present embodiment, a casing 46 is formed by threadably engaging a reduced diameter portion of the rearmost tubular member 44, located at its front end, with the rear axial portion of the tubular member 43 in an integral manner. The inner periphery of the tubular member 43 which forms the casing 46 is integrally connected to the tubular member 42 by being fitted into the outer periphery, at the rear end, of the tubular member 42 which is located immediately forwardly thereof, while the outer periphery of the tubular member 43 extends through the opening 1a in the shell 1 and maintains a hermetic seal therebetween by means of an annular seal 47.

A ring-shaped seal member 48, formed of rubber, is mounted between the inner periphery of the reduced diameter portion, located at the front end of the tubular member 44, and the outer periphery of the input shaft 31, thus maintaining a hermetic seal between the inner periphery of the reduced diameter portion and the outer periphery of the input shaft 31. A ring-shaped retainer 51 is inserted from the rearward side of the seal member 48 and is a press fit around the inner periphery of the reduced diameter portion of the tubular member 44, thereby preventing disengagement of the seal member 48 from the reduced diameter portion.

An end face of the tubular member 43 is formed, at a location radially outward of the seal member 48, with an axial through-opening 43a, which constitutes together with the inner peripheral surface of the tubular member 43, a communication path 52 which allows the atmosphere passage 27 to communicate with the atmosphere. In this manner, the atmosphere is normally introduced into the atmosphere passage 27 through the communication path 52.

A substantially disc-shaped piston 53 has its axial portion integrally connected around the input shaft 31 at a location rearward of the seal member 48 and within an increased diameter portion of the tubular member 44. A rubber diaphragm 54 extends across the inner peripheral edge of the rear end face of the piston 53 or the outer periphery of the input shaft 31 and the inner periphery of the increased diameter portion of the tubular member 44, thereby maintaining a hermetic seal between the outer periphery of the input shaft 31 and the inner periphery of the increased diameter portion of the tubular member 44. The diaphragm 54 includes a bead 54a extending around its inner periphery, and a retainer 55 of a reduced diameter is fitted around the input shaft 31 from the rear side of the bead 54a to maintain it held sandwiched between the piston 53 and the retainer, thus preventing its withdrawal. The diaphragm 54 also includes a bead 54b extending around its outer periphery, and a retainer 56 of an increased diameter is disposed as a press fit into the increased diameter portion of the tubular member 44 from the rear side of the bead 54b, thus maintaining it in position. In this manner, the diaphragm 54 is held in tight contact with the rear end face of the piston 53, which is therefore normally subject to the atmospheric pressure from the rear side.

A pressure chamber 57 is defined inside the tubular member 44 as delineated between the seal member 48 and the diaphragm 54. A conduit 58 has its one end 58a connected into the pressure chamber 57, and has another end 58b which is connected to a valve element 60 of a flow path switching valve 59. The switching valve 59 is of an on-off control type, but is not actuated under the inoperative condition of the brake booster shown in FIG. 1, and accordingly, the valve element 60 assumes its inoperative position shown as urged by a spring 61. When the brake booster is inoperative, the valve 59 is inoperative, and accordingly, the end 58b of the conduit 58 is open to the atmosphere. Hence, the atmosphere is introduced into the pressure chamber 57 of the actuator 45, whereby the atmospheric pressure is applied to both sides of the piston 53 and the actuator 45 is not actuated.

By contrast, when the flow path switching valve 59 is operated under the inoperative condition of the brake booster, the valve element 60 is driven to its operative position while compressing the spring 61 to switch the flow path, whereby the end 58b of the conduit 58 can no longer communicate with the atmosphere, but communicates with a source of negative pressure, not shown. Accordingly, a negative pressure is introduced into the pressure chamber 57, developing a pressure differential across the piston 53 due to the negative pressure and the atmospheric pressure, causing the piston 53 and the input shaft 31 to be driven forward. This operates the valve mechanism 13 and after the vacuum valve 21 is closed, the atmosphere valve 24 is opened, introducing the atmosphere into the variable pressure chambers B and D. In this manner, the brake booster is operated to provide the function of an automatic brake without depressing a brake pedal.

In the event the conduit 58 connected to the actuator 45 is fractured or the end 58a of the conduit 58 connected to the tubular member 44 is disengaged from the tubular member 44, the atmosphere would be introduced into the pressure chamber 57. However, the flow path switching valve 59 is not actuated under the inoperative condition of the brake booster, and accordingly, the atmosphere is introduced into the pressure chamber 57 under such condition. Accordingly, a fracture of the conduit 58 or the disengagement of the end 58a of the conduit 58 from the tubular member 44 does not cause any pressure fluctuation within the pressure chamber 57, which continues to assume the atmospheric pressure. Hence, the actuator 45 cannot be actuated in such instance, reliably preventing a malfunctioning of the brake booster.

In the present embodiment, the conduit 58 and the flow path switching valve 59 which are used to actuate the actuator 45 are separate from the tubing 23 connected to the shell 1 for introducing the negative pressure. Accordingly, during a normal braking operation, it is assured that the atmosphere is exhausted through the tubing 23 when the valve body 5 and other members are returned from their operative to their inoperative position shown, thus preventing any retardation in the rate of returning the valve body 5 and other members. By contrast, in a booster as disclosed in Japanese Laid-Open Patent Application No. 25,840/1985 in which bellows is provided in a constant pressure chamber within a shell, a flow path switching valve, which causes the bellows to communicate with either a negative pressure or the atmosphere, is disposed in a tubing connected to the bellows which is used to introduce the negative pressure. In such a conventional arrangement, the flow path switching valve cannot have a sufficient channel area, and the flow path switching valve is located distant from the bellows. This results in a disadvantage that it takes a longer time for exhaust and the rate of returning the valve body or the like will be retarded during a normal braking operation, inasmuch as the exhaust takes place through the negative pressure introducing tubing and the flow path switching valve when the valve body and other members are returned from their operative to their inoperative position shown.

In addition, according to the present embodiment, the pressure chamber 57 of the actuator 45 has a reduced volume, which allows the consumption of a negative pressure which is introduced into the pressure chamber 57 in order to actuate the actuator 45 to be suppressed while maintaining a good response in the operation of the actuator 45.

Second Embodiment

Figure 2:
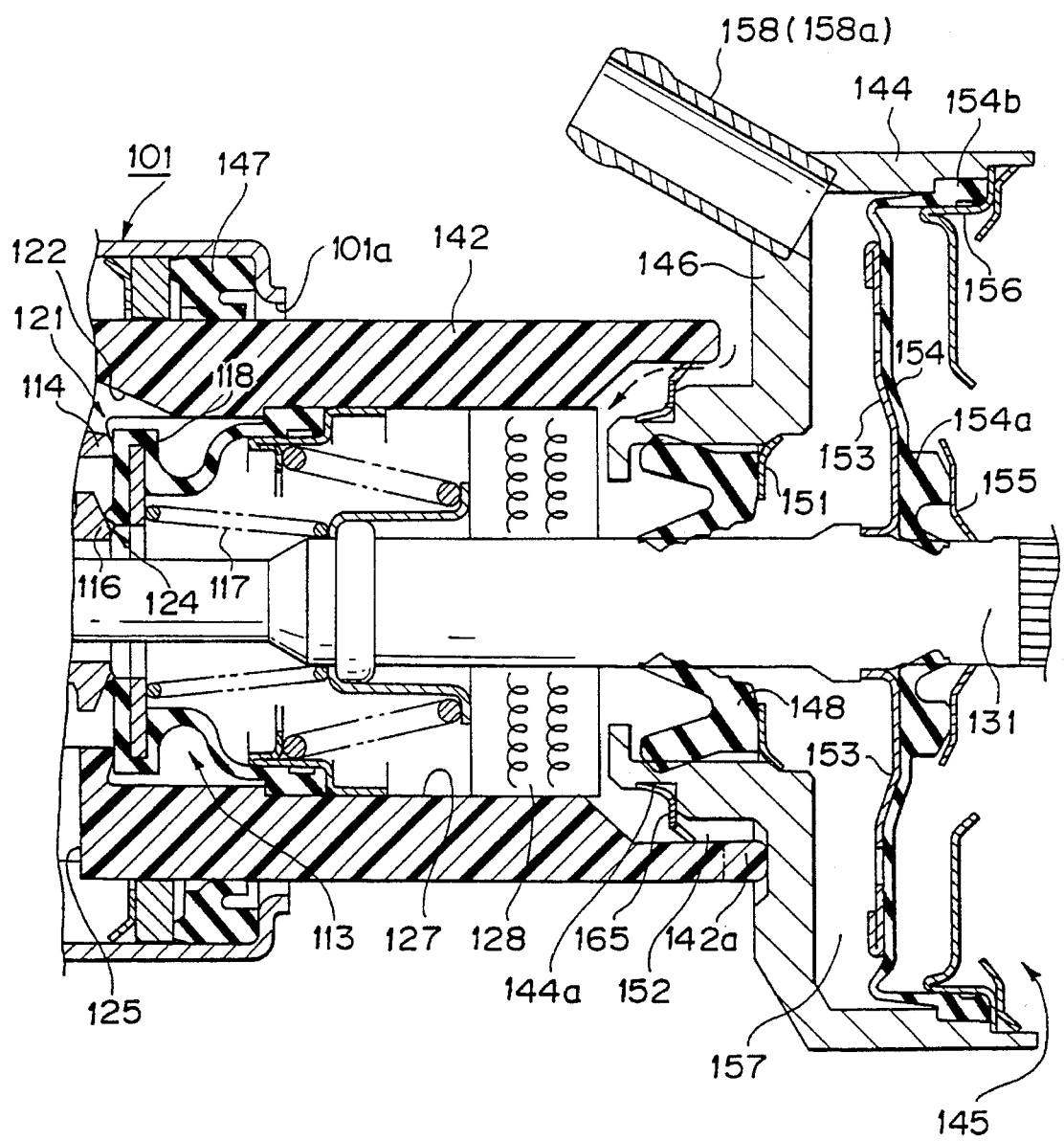
FIG. 2 is a longitudinal section of a second embodiment of the invention.

FIG. 2 shows a second embodiment of the invention. In the second embodiment, the tubular member 43 shown in the first embodiment is eliminated and instead a tubular member 142 (corresponding to the tubular member 42 of the previous embodiment) extends through an opening 101a formed in a shell 101 to project to the outside thereof, and a reduced diameter portion of a tubular member 144 is connected with the inner periphery of the tubular member 142 at its rear end around its inner periphery. An annular retainer 165 has a plurality of engaging pawls around its inner periphery, which are fitted into an annular groove 144a formed around the outer periphery of the tubular member 144. Under this condition, a reduced diameter portion of the tubular member 144 is loosely fitted into the inner periphery of the tubular member 142 from the rear side while simultaneously bringing a plurality of engaging pawls, formed around the outer periphery of the retainer 165, into a press fit around the inner periphery of the tubular member 142. At its rear end, the tubular member 142 is formed with a plurality of engaging tabs 142a which are spaced apart by an equal spacing in the circumferential direction and which project rearwardly through a given length. In a corresponding manner, a stepped end face, which is located opposite to the tabs, of the tubular member 144 is formed with a plurality of engaging recesses 144b, which are dimensioned to mate the engaging tabs 142a. In this manner, the engaging tabs 142a and the engaging recesses 144b mate each other when the tubular member 144 and the retainer 165 is fitted into the tubular member 142 from the rear side for connection therebetween. As a result of such connection, a relative rotation between the tubular members 142, 144 in the circumferential direction is prevented while positioning the both members in the axial direction for connection.

When the tubular member 144 is connected to the tubular member 142 in this manner, a space left adjacent to the mating combination of the tabs 142a and the recesses 144b as well as a space left between adjacent engaging pawls formed around the outer periphery of the retainer 165 when they are disposed inside the tubular member 142 constitute together a communication path 152, which allows a communication passage 127 to be maintained in communication with the atmosphere.

In other respects, the arrangement is similar to that of the first embodiment, and accordingly corresponding parts to those of the first embodiment are designated by like numerals as used before, to which 100 is added.

The second embodiment achieves the same functioning and effect as those achieved by the first embodiment.

While the invention has been shown and described above in connection with several embodiments thereof, it should be understood that a number of changes, modifications and substitutions therein would readily occur to one skilled in the art from the above disclosure without departing from the scope and spirit of the invention defined by the appended claims. Accordingly, it is intended that the invention is not limited to the specific arrangements and components disclosed, but is solely defined by the claims.

What is claimed is:

1. A booster including a tubular valve body slidably disposed within a shell and having its rear end projecting outward of the shell, a power piston mounted on the valve body, a constant and a variable pressure chamber defined across the power piston, a valve mechanism disposed within the valve body for switching a communication between the constant pressure chamber and the variable pressure chamber and the atmosphere, and an input shaft having its one end connected to a valve plunger, which forms part of the valve mechanism, and having its other end connected to a brake pedal, characterized by an actuator disposed on the rear side of the valve body for causing the input shaft to move forward, the actuator comprising a first seal means disposed across the inner periphery of the valve body and the outer periphery of the input shaft for maintaining a hermetic seal therebetween, a communication path for causing an atmosphere passage formed within the valve body at a location forward of the first seal means to communicate with the atmospheres, an actuator piston connected to the outer periphery of the input shaft at a location rearward of the first seal means and having a rear end face which is normally subject to the atmosphere, second seal means extending across the actuator piston and the inner periphery of the valve body for maintaining a hermetic seal therebetween, and a pressure chamber formed within the valve body at a location intermediate the first seal means and the actuator piston, the atmosphere being introduced into the pressure chamber when the booster is inoperative and a negative pressure being introduced into the pressure chamber when required.

2. A booster according to claim 1 in which the valve body comprises a plurality of tubular members which are axially disposed, a rearmost one of the tubular members and an adjacent said tubular member which is located immediately forwardly thereof forming a casing for the actuator, both of said seal means being disposed across the inner periphery of the rearmost tubular member and the outer periphery of the input shaft, the pressure chamber being defined inside the rearmost tubular member, the pressure chamber being selectively communicatable with the atmosphere or a source of negative pressure through a conduit connected to the pressure chamber, and a flow path switching valve which is connected to the other end of the conduit.

3. A booster according to claim 2 in which the rearmost tubular member is provided with a reduced diameter portion at its front end and an increased diameter portion at its rear end, the reduced diameter portion being threadably engaged, from the rear side, with an axial portion of the tubular member which is located immediately forwardly thereof to connect the both tubular members together, the tubular member which is located immediately forwardly of the reduced diameter portion and which is threadably engaged therewith having a rear end face in which an axial through-opening is formed, the communication path being defined by the through-opening and the inner periphery of the tubular member in which the through-opening is formed.

4. A booster according to claim 2 in which the rearmost tubular member has a reduced diameter portion at its front end and an increased diameter portion at its rear end, the rearmost tubular member having a stepped end face between the reduced diameter portion and the increased diameter portion, the stepped end face being formed with a plurality of engaging recesses which are spaced apart circumferentially, the tubular member which is located immediately forwardly of the rearmost tubular member being formed with a plurality of engaging tabs at its rear end which are spaced apart circumferentially, the arrangement being such that when the reduced diameter portion of the rearmost tubular member is loosely fitted, from the rear side, into the inner periphery of the immediately forwardly located tubular member, a ring-shaped retainer having engaging pawls is interposed between the both tubular members and the engaging recesses are engaged by the engaging tabs, thus connecting the rearmost tubular member and the immediately forwardly located tubular member together, a radial space left between the engaging tabs as well as a space left between the reduced diameter portion and the inner periphery of the tubular member in which it is loosely fitted, the spaces constituting together the communication path.

* * * * *

UNITED STATES PATENT AND TRADEMARK OFFICE
CERTIFICATE OF CORRECTION

PATENT NO. : 5 537 910
DATED : July 23, 1996
INVENTOR(S) : Makoto WATANABE

It is certified that error appears in the above-indentified patent and that said Letters Patent is hereby corrected as shown below:

```
Column 7, line 26; change "atmospheres" to
     ---atmosphere---.
```

Signed and Sealed this

Fourteenth Day of January, 1997

Attest:

BRUCE LEHMAN

Attesting Officer     Commissioner of Patents and Trademarks